(12) United States Patent
Heap et al.

(10) Patent No.: US 8,121,766 B2
(45) Date of Patent: Feb. 21, 2012

(54) METHOD FOR OPERATING AN INTERNAL COMBUSTION ENGINE TO TRANSMIT POWER TO A DRIVELINE

(75) Inventors: Anthony H. Heap, Ann Arbor, MI (US); Bin Wu, Troy, MI (US); Wilfried Brunssen, Ypsilanti, MI (US); Jason J McConnell, Ypsilanti, MI (US); Kee Yong Kim, Ann Arbor, MI (US); Brian R Medema, Waterford, MI (US)

(73) Assignees: GM Global Technology Operations LLC, Detroit, MI (US); Daimler AG, Stuttgart (DE); Chrysler LLC, Auburn Hills, MI (US); Bayerische Motoren Werke Aktiengesellschaft, Munich (DE)

( * ) Notice: Subject to any disclaimer, the term of this patent is extended or adjusted under 35 U.S.C. 154(b) by 721 days.

(21) Appl. No.: 12/239,862

(22) Filed: Sep. 29, 2008

(65) Prior Publication Data

US 2009/0118999 A1    May 7, 2009

Related U.S. Application Data

(60) Provisional application No. 60/985,257, filed on Nov. 4, 2007.

(51) Int. Cl.
*G06F 7/00* (2006.01)
(52) U.S. Cl. .......................................... 701/54; 701/51
(58) Field of Classification Search .................... 701/51, 701/53, 54, 79, 84, 87, 101; 477/3, 7
See application file for complete search history.

(56) References Cited

U.S. PATENT DOCUMENTS

| | | |
|---|---|---|
| 6,832,148 B1 | 12/2004 | Bennett |
| 6,868,318 B1 | 3/2005 | Cawthorne |
| 7,154,236 B1 | 12/2006 | Heap |
| 2005/0076958 A1 | 4/2005 | Foster |
| 2005/0077867 A1 | 4/2005 | Cawthorne |
| 2005/0077877 A1 | 4/2005 | Cawthorne |
| 2005/0080523 A1 | 4/2005 | Bennett |
| 2005/0080527 A1 | 4/2005 | Tao |
| 2005/0080535 A1 | 4/2005 | Steinmetz |
| 2005/0080537 A1 | 4/2005 | Cawthorne |
| 2005/0080538 A1 | 4/2005 | Hubbard |
| 2005/0080539 A1 | 4/2005 | Hubbard |
| 2005/0080540 A1 | 4/2005 | Steinmetz |
| 2005/0080541 A1 | 4/2005 | Sah |
| 2005/0182526 A1 | 8/2005 | Hubbard |
| 2005/0182543 A1 | 8/2005 | Sah |
| 2005/0182546 A1 | 8/2005 | Hsieh |
| 2005/0182547 A1 | 8/2005 | Sah |
| 2005/0189918 A1 | 9/2005 | Weisgerber |
| 2005/0252283 A1 | 11/2005 | Heap |
| 2005/0252305 A1 | 11/2005 | Hubbard |

(Continued)

*Primary Examiner* — Gertrude Arthur Jeanglaude

(57) ABSTRACT

A method for operating an engine includes defining a two-dimensional search region based upon an input power transmittable between the internal combustion engine and an electromechanical transmission. The method further includes iteratively dividing the two-dimensional search region into a plurality of subregions based upon one of the input power and the input speed, iteratively determining an engine operating point within each of the subregions, iteratively calculating an operating cost to operate the internal combustion engine and the electromechanical transmission to meet the operator torque request for each engine operating point within each of the subregions, and iteratively identifying the subregion having a minimum operating cost to meet the operator torque request. A preferred engine operating point is determined based upon the engine operating point within the identified subregion having the minimum operating cost to meet the operator torque request.

20 Claims, 4 Drawing Sheets

U.S. PATENT DOCUMENTS

| | | |
|---|---|---|
| 2005/0252474 A1 | 11/2005 | Sah |
| 2005/0255963 A1 | 11/2005 | Hsieh |
| 2005/0255964 A1 | 11/2005 | Heap |
| 2005/0255965 A1 | 11/2005 | Tao |
| 2005/0255966 A1 | 11/2005 | Tao |
| 2005/0255967 A1 | 11/2005 | Foster |
| 2005/0255968 A1 | 11/2005 | Sah |
| 2005/0256617 A1 | 11/2005 | Cawthorne |
| 2005/0256618 A1 | 11/2005 | Hsieh |
| 2005/0256623 A1 | 11/2005 | Hubbard |
| 2005/0256625 A1 | 11/2005 | Sah |
| 2005/0256626 A1 | 11/2005 | Hsieh |
| 2005/0256627 A1 | 11/2005 | Sah |
| 2005/0256629 A1 | 11/2005 | Tao |
| 2005/0256631 A1 | 11/2005 | Cawthorne |
| 2005/0256633 A1 | 11/2005 | Heap |
| 2005/0256919 A1 | 11/2005 | Cawthorne |
| 2006/0194670 A1 | 8/2006 | Heap |
| 2007/0078580 A1 | 4/2007 | Cawthorne |
| 2007/0093953 A1 | 4/2007 | Heap |
| 2007/0149348 A1 | 6/2007 | Holmes |
| 2007/0191181 A1 | 8/2007 | Burns |
| 2007/0225886 A1 | 9/2007 | Morris |
| 2007/0225887 A1 | 9/2007 | Morris |
| 2007/0225888 A1 | 9/2007 | Morris |
| 2007/0225889 A1 | 9/2007 | Morris |
| 2007/0260381 A1 | 11/2007 | Sah |
| 2007/0276569 A1 | 11/2007 | Sah |
| 2007/0284162 A1 | 12/2007 | Zettel |
| 2007/0284163 A1 | 12/2007 | Heap |
| 2007/0284176 A1 | 12/2007 | Sah |
| 2007/0285059 A1 | 12/2007 | Zettel |
| 2007/0285060 A1 | 12/2007 | Zettel |
| 2007/0285061 A1 | 12/2007 | Zettel |
| 2007/0285063 A1 | 12/2007 | Zettel |
| 2007/0285097 A1 | 12/2007 | Zettel |
| 2008/0004779 A1 | 1/2008 | Sah |
| 2008/0028879 A1 | 2/2008 | Robinette |
| 2008/0032855 A1 | 2/2008 | Sah |
| 2008/0064559 A1 | 3/2008 | Cawthorne |
| 2008/0064562 A1 | 3/2008 | Aettel |
| 2008/0103003 A1 | 5/2008 | Sah |
| 2008/0119320 A1 | 5/2008 | Wu |
| 2008/0119321 A1 | 5/2008 | Heap |
| 2008/0120000 A1 | 5/2008 | Heap |
| 2008/0120001 A1 | 5/2008 | Heap |
| 2008/0120002 A1 | 5/2008 | Heap |
| 2008/0176706 A1 | 7/2008 | Wu |
| 2008/0176709 A1 | 7/2008 | Wu |
| 2008/0181280 A1 | 7/2008 | Wang |
| 2008/0182696 A1 | 7/2008 | Sah |
| 2008/0183372 A1 | 7/2008 | Snyder |
| 2008/0234097 A1 | 9/2008 | Sah |
| 2008/0236921 A1 | 10/2008 | Huseman |
| 2008/0243346 A1 | 10/2008 | Huseman |
| 2008/0249745 A1 | 10/2008 | Heap |
| 2008/0262694 A1 | 10/2008 | Heap |
| 2008/0262698 A1 | 10/2008 | Lahti |
| 2008/0272717 A1 | 11/2008 | Gleason |
| 2008/0275611 A1 | 11/2008 | Snyder |
| 2008/0275624 A1 | 11/2008 | Snyder |
| 2008/0275625 A1 | 11/2008 | Snyder |
| 2008/0287255 A1 | 11/2008 | Snyder |
| 2009/0069148 A1 | 3/2009 | Heap |
| 2009/0069989 A1 | 3/2009 | Heap |
| 2009/0070019 A1 | 3/2009 | Heap |
| 2009/0082170 A1 | 3/2009 | Heap |
| 2009/0088294 A1 | 4/2009 | West |
| 2009/0105039 A1 | 4/2009 | Sah |
| 2009/0105896 A1 | 4/2009 | Tamai |
| 2009/0105898 A1 | 4/2009 | Wu |
| 2009/0105914 A1 | 4/2009 | Buur |
| 2009/0107745 A1 | 4/2009 | Buur |
| 2009/0107755 A1 | 4/2009 | Kothari |
| 2009/0108673 A1 | 4/2009 | Wang |
| 2009/0111637 A1 | 4/2009 | Day |
| 2009/0111640 A1 | 4/2009 | Buur |
| 2009/0111642 A1 | 4/2009 | Sah |
| 2009/0111643 A1 | 4/2009 | Sah |
| 2009/0111644 A1 | 4/2009 | Kaminsky |
| 2009/0111645 A1 | 4/2009 | Heap |
| 2009/0112385 A1 | 4/2009 | Heap |
| 2009/0112392 A1 | 4/2009 | Buur |
| 2009/0112399 A1 | 4/2009 | Buur |
| 2009/0112412 A1 | 4/2009 | Cawthorne |
| 2009/0112416 A1 | 4/2009 | Heap |
| 2009/0112417 A1 | 4/2009 | Kaminsky |
| 2009/0112418 A1 | 4/2009 | Buur |
| 2009/0112419 A1 | 4/2009 | Heap |
| 2009/0112420 A1 | 4/2009 | Buur |
| 2009/0112421 A1 | 4/2009 | Sah |
| 2009/0112422 A1 | 4/2009 | Sah |
| 2009/0112423 A1 | 4/2009 | Foster |
| 2009/0112427 A1 | 4/2009 | Heap |
| 2009/0112428 A1 | 4/2009 | Sah |
| 2009/0112429 A1 | 4/2009 | Sah |
| 2009/0112495 A1 | 4/2009 | Center |
| 2009/0115349 A1 | 5/2009 | Heap |
| 2009/0115350 A1 | 5/2009 | Heap |
| 2009/0115351 A1 | 5/2009 | Heap |
| 2009/0115352 A1 | 5/2009 | Heap |
| 2009/0115353 A1 | 5/2009 | Heap |
| 2009/0115354 A1 | 5/2009 | Heap |
| 2009/0115365 A1 | 5/2009 | Heap |
| 2009/0115373 A1 | 5/2009 | Kokotovich |
| 2009/0115377 A1 | 5/2009 | Schwenke |
| 2009/0115408 A1 | 5/2009 | West |
| 2009/0115491 A1 | 5/2009 | Anwar |
| 2009/0118074 A1 | 5/2009 | Zettel |
| 2009/0118075 A1 | 5/2009 | Heap |
| 2009/0118076 A1* | 5/2009 | Heap et al. .................. 477/3 |
| 2009/0118077 A1 | 5/2009 | Hsieh |
| 2009/0118078 A1 | 5/2009 | Wilmanowicz |
| 2009/0118079 A1 | 5/2009 | Heap |
| 2009/0118080 A1 | 5/2009 | Heap |
| 2009/0118081 A1 | 5/2009 | Heap |
| 2009/0118082 A1 | 5/2009 | Heap |
| 2009/0118083 A1 | 5/2009 | Kaminsky |
| 2009/0118084 A1 | 5/2009 | Heap |
| 2009/0118085 A1 | 5/2009 | Heap |
| 2009/0118086 A1 | 5/2009 | Heap |
| 2009/0118087 A1 | 5/2009 | Hsieh |
| 2009/0118089 A1 | 5/2009 | Heap |
| 2009/0118090 A1 | 5/2009 | Heap |
| 2009/0118091 A1 | 5/2009 | Lahti |
| 2009/0118093 A1 | 5/2009 | Heap |
| 2009/0118094 A1 | 5/2009 | Hsieh |
| 2009/0118877 A1 | 5/2009 | Center |
| 2009/0118879 A1 | 5/2009 | Heap |
| 2009/0118880 A1 | 5/2009 | Heap |
| 2009/0118882 A1 | 5/2009 | Heap |
| 2009/0118883 A1 | 5/2009 | Heap |
| 2009/0118884 A1 | 5/2009 | Heap |
| 2009/0118885 A1 | 5/2009 | Heap |
| 2009/0118886 A1 | 5/2009 | Tamai |
| 2009/0118887 A1 | 5/2009 | Minarcin |
| 2009/0118888 A1 | 5/2009 | Minarcin |
| 2009/0118901 A1 | 5/2009 | Cawthorne |
| 2009/0118914 A1 | 5/2009 | Schwenke |
| 2009/0118915 A1 | 5/2009 | Heap |
| 2009/0118916 A1 | 5/2009 | Kothari |
| 2009/0118917 A1 | 5/2009 | Sah |
| 2009/0118918 A1 | 5/2009 | Heap |
| 2009/0118919 A1 | 5/2009 | Heap |
| 2009/0118920 A1 | 5/2009 | Heap |
| 2009/0118921 A1 | 5/2009 | Heap |
| 2009/0118922 A1 | 5/2009 | Heap |
| 2009/0118923 A1 | 5/2009 | Heap |
| 2009/0118924 A1 | 5/2009 | Heap |
| 2009/0118925 A1 | 5/2009 | Hsieh |
| 2009/0118926 A1 | 5/2009 | Heap |
| 2009/0118927 A1 | 5/2009 | Heap |
| 2009/0118928 A1 | 5/2009 | Heap |
| 2009/0118929 A1 | 5/2009 | Heap |
| 2009/0118930 A1 | 5/2009 | Heap |
| 2009/0118931 A1 | 5/2009 | Kaminsky |
| 2009/0118932 A1 | 5/2009 | Heap |

| | | | | | | |
|---|---|---|---|---|---|---|
| 2009/0118933 | A1 | 5/2009 | Heap | 2009/0118948 A1 | 5/2009 | Heap |
| 2009/0118934 | A1 | 5/2009 | Heap | 2009/0118949 A1 | 5/2009 | Heap |
| 2009/0118935 | A1 | 5/2009 | Heap | 2009/0118950 A1 | 5/2009 | Heap |
| 2009/0118936 | A1 | 5/2009 | Heap | 2009/0118951 A1 | 5/2009 | Heap |
| 2009/0118937 | A1 | 5/2009 | Heap | 2009/0118952 A1 | 5/2009 | Heap |
| 2009/0118938 | A1 | 5/2009 | Heap | 2009/0118954 A1 | 5/2009 | Wu |
| 2009/0118939 | A1 | 5/2009 | Heap | 2009/0118957 A1 | 5/2009 | Heap |
| 2009/0118940 | A1 | 5/2009 | Heap | 2009/0118962 A1 | 5/2009 | Heap |
| 2009/0118941 | A1 | 5/2009 | Heap | 2009/0118963 A1 | 5/2009 | Heap |
| 2009/0118942 | A1 | 5/2009 | Hsieh | 2009/0118964 A1 | 5/2009 | Snyder |
| 2009/0118943 | A1 | 5/2009 | Heap | 2009/0118969 A1 | 5/2009 | Heap |
| 2009/0118944 | A1 | 5/2009 | Heap | 2009/0118971 A1 | 5/2009 | Heap |
| 2009/0118945 | A1 | 5/2009 | Heap | 2009/0144002 A1 | 6/2009 | Zettel |
| 2009/0118946 | A1 | 5/2009 | Heap | | | |
| 2009/0118947 | A1 | 5/2009 | Heap | | | |

* cited by examiner

METHOD FOR OPERATING AN INTERNAL COMBUSTION ENGINE TO TRANSMIT POWER TO A DRIVELINE

CROSS REFERENCE TO RELATED APPLICATION

This application claims the benefit of U.S. Provisional Application No. 60/985,257 filed on Nov. 4, 2007 which is hereby incorporated herein by reference.

TECHNICAL FIELD

This disclosure is related to controlling an engine within a hybrid vehicle.

BACKGROUND

The statements in this section merely provide background information related to the present disclosure and may not constitute prior art.

Known powertrain architectures include torque-generative devices, including internal combustion engines and electric machines, which transmit torque through a transmission device to an output member. One exemplary powertrain includes a two-mode, compound-split, electromechanical transmission which utilizes an input member for receiving motive torque from a prime mover power source, preferably an internal combustion engine, and an output member. The output member can be operatively connected to a driveline for a motor vehicle for transmitting tractive torque thereto. Electric machines, operative as motors or generators, generate a torque input to the transmission, independently of a torque input from the internal combustion engine. The electric machines may transform vehicle kinetic energy, transmitted through the vehicle driveline, to electrical energy that is storable in an electrical energy storage device. A control system monitors various inputs from the vehicle and the operator and provides operational control of the powertrain, including controlling transmission operating state and gear shifting, controlling the torque-generative devices, and regulating the electrical power interchange among the electrical energy storage device and the electric machines to manage outputs of the transmission, including torque and rotational speed.

SUMMARY

An internal combustion engine is mechanically coupled to an electro-mechanical transmission to transmit power to a driveline in response to an operator torque request. A method for operating the engine includes defining a two-dimensional search region based upon an input power transmittable between the internal combustion engine and the electromechanical transmission. The method further includes iteratively dividing the two-dimensional search region into a plurality of subregions based upon one of the input power and the input speed, iteratively determining an engine operating point within each of the subregions, iteratively calculating an operating cost to operate the internal combustion engine and the electromechanical transmission to meet the operator torque request for each engine operating point within each of the subregions, and iteratively identifying the subregion having a minimum operating cost to meet the operator torque request. A preferred engine operating point is determined based upon the engine operating point within the identified subregion having the minimum operating cost to meet the operator torque request.

BRIEF DESCRIPTION OF THE DRAWINGS

One or more embodiments will now be described, by way of example, with reference to the accompanying drawings, in which.

DETAILED DESCRIPTION

Figure 1:
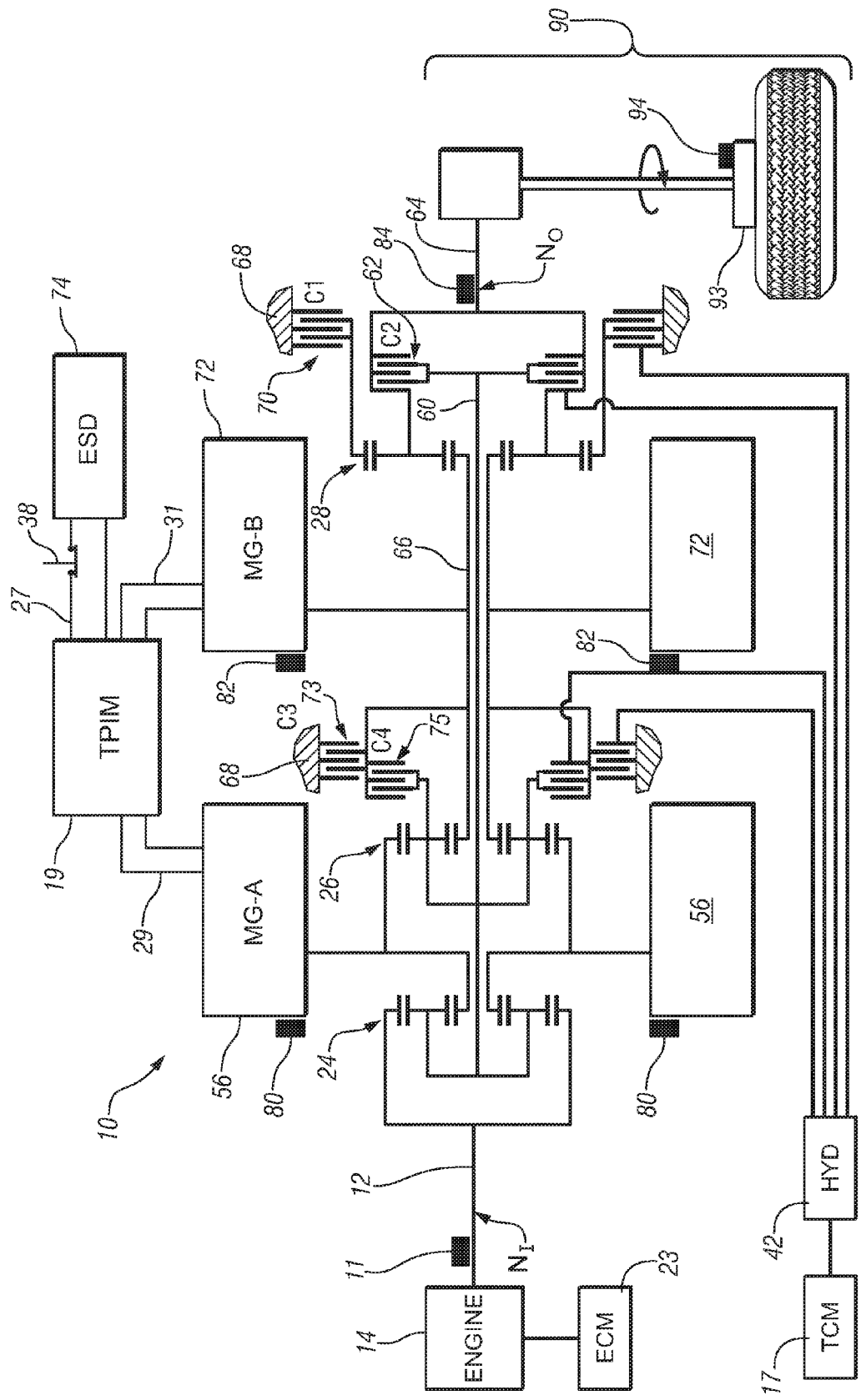
FIG. 1 is a schematic diagram of an exemplary powertrain, in accordance with the present disclosure.
Figure 2:
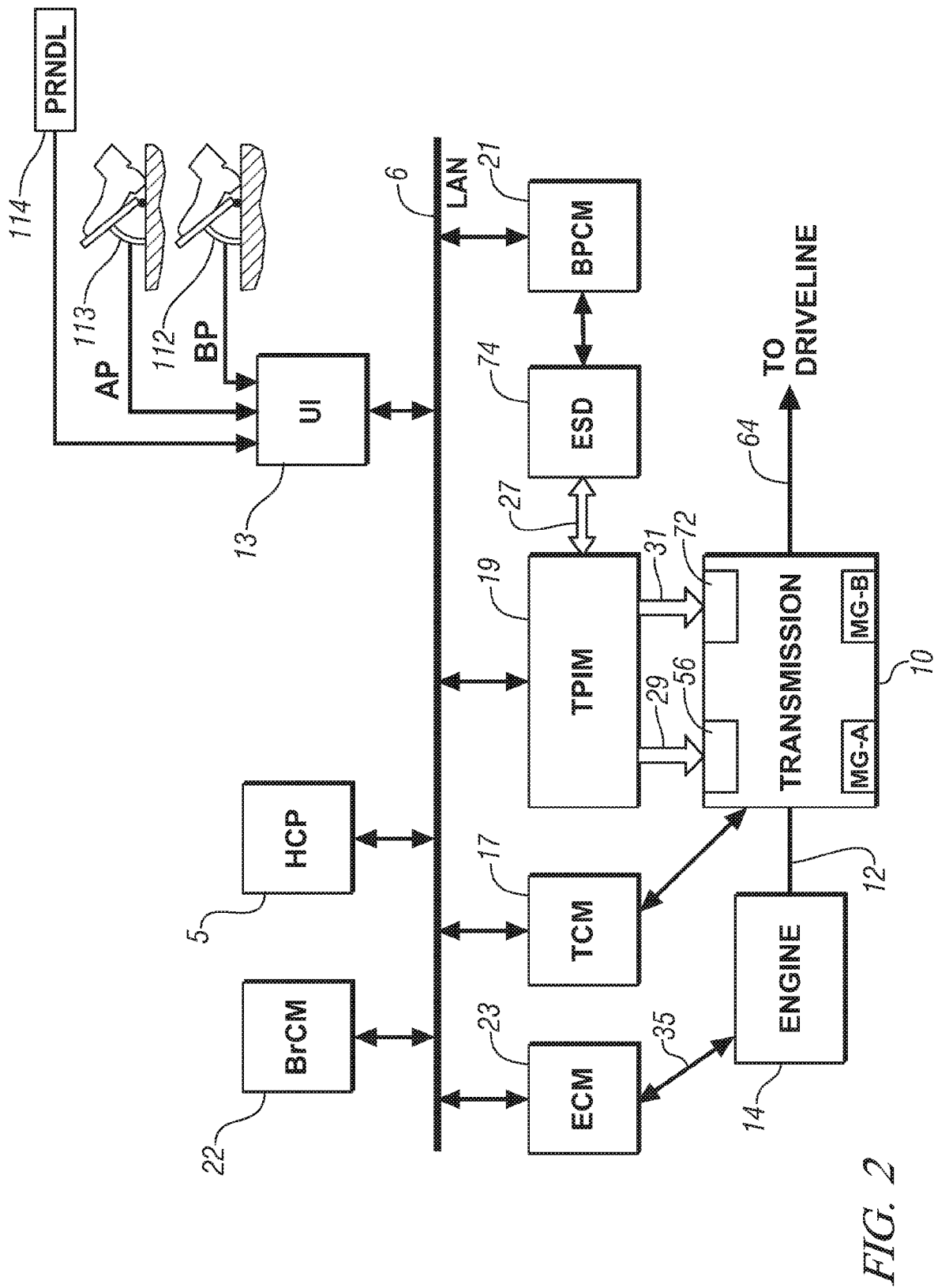
FIG. 2 is a schematic diagram of an exemplary architecture for a control system and powertrain, in accordance with the present disclosure.

Referring now to the drawings, wherein the showings are for the purpose of illustrating certain exemplary embodiments only and not for the purpose of limiting the same, FIGS. 1 and 2 depict an exemplary electro-mechanical hybrid powertrain. The exemplary electromechanical hybrid powertrain in accordance with the present disclosure is depicted in FIG. 1, comprising a two-mode, compound-split, electromechanical hybrid transmission 10 operatively connected to an engine 14 and first and second electric machines ('MG-A') 56 and ('MG-B') 72. The engine 14 and first and second electric machines 56 and 72 each generate power which can be transferred to the transmission 10. The power generated by the engine 14 and the first and second electric machines 56 and 72 and transferred to the transmission 10 is described in terms of input and motor torques, referred to herein as $T_I$, $T_A$, and $T_B$ respectively, and speed, referred to herein as $N_I$, $N_A$, and $N_B$, respectively.

The exemplary engine 14 comprises a multi-cylinder internal combustion engine selectively operative in several states to transfer torque to the transmission 10 via an input shaft 12, and can be either a spark-ignition or a compression-ignition engine. The engine 14 includes a crankshaft (not shown) operatively coupled to the input shaft 12 of the transmission 10. A rotational speed sensor 11 monitors rotational speed of the input shaft 12. Power output from the engine 14, comprising rotational speed and engine torque, can differ from the input speed N, and the input torque $T_I$ to the transmission 10 due to placement of torque-consuming components on the input shaft 12 between the engine 14 and the transmission 10, e.g., a hydraulic pump (not shown) and/or a torque management device (not shown).

The exemplary transmission 10 comprises three planetary-gear sets 24, 26 and 28, and four selectively engageable torque-transferring devices, i.e., clutches C1 70, C2 62, C3 73, and C4 75. As used herein, clutches refer to any type of friction torque transfer device including single or compound plate clutches or packs, band clutches, and brakes, for example. A hydraulic control circuit 42, preferably controlled by a transmission control module (hereafter 'TCM') 17, is operative to control clutch states. Clutches C2 62 and C4 75 preferably comprise hydraulically-applied rotating friction clutches. Clutches C1 70 and C3 73 preferably comprise hydraulically-controlled stationary devices that can be selectively grounded to a transmission case 68. Each of the clutches C1 70, C2 62, C3 73, and C4 75 is preferably hydraulically applied, selectively receiving pressurized hydraulic fluid via the hydraulic control circuit 42.

The first and second electric machines 56 and 72 preferably comprise three-phase AC machines, each including a stator (not shown) and a rotor (not shown), and respective resolvers 80 and 82. The motor stator for each machine is grounded to an outer portion of the transmission case 68, and includes a stator core with coiled electrical windings extending therefrom. The rotor for the first electric machine 56 is supported on a hub plate gear that is operatively attached to shaft 60 via the second planetary gear set 26. The rotor for the second electric machine 72 is fixedly attached to a sleeve shaft hub 66.

Each of the resolvers 80 and 82 preferably comprises a variable reluctance device including a resolver stator (not shown) and a resolver rotor (not shown). The resolvers 80 and 82 are appropriately positioned and assembled on respective ones of the first and second electric machines 56 and 72. Stators of respective ones of the resolvers 80 and 82 are operatively connected to one of the stators for the first and second electric machines 56 and 72. The resolver rotors are operatively connected to the rotor for the corresponding first and second electric machines 56 and 72. Each of the resolvers 80 and 82 is signally and operatively connected to a transmission power inverter control module (hereafter 'TPIM') 19, and each senses and monitors rotational position of the resolver rotor relative to the resolver stator, thus monitoring rotational position of respective ones of first and second electric machines 56 and 72. Additionally, the signals output from the resolvers 80 and 82 are interpreted to provide the rotational speeds for first and second electric machines 56 and 72, i.e., $N_A$ and $N_B$, respectively.

The transmission 10 includes an output member 64, e.g. a shaft, which is operably connected to a driveline 90 for a vehicle (not shown), to provide output power to the driveline 90 that is transferred to vehicle wheels 93, one of which is shown in FIG. 1. The output power at the output member 64 is characterized in terms of an output rotational speed $N_O$ and an output torque $T_O$. A transmission output speed sensor 84 monitors rotational speed and rotational direction of the output member 64. Each of the vehicle wheels 93 is preferably equipped with a sensor 94 adapted to monitor wheel speed, $V_{SS\text{-}WHL}$, the output of which is monitored by a control module of a distributed control module system described with respect to FIG. 2, to determine vehicle speed, and absolute and relative wheel speeds for braking control, traction control, and vehicle acceleration management.

The input torque from the engine 14 and the motor torques from the first and second electric machines 56 and 72 ($T_I$, $T_A$, and $T_B$ respectively) are generated as a result of energy conversion from fuel or electrical potential stored in an electrical energy storage device (hereafter 'ESD') 74. The ESD 74 is high voltage DC-coupled to the TPIM 19 via DC transfer conductors 27. The transfer conductors 27 include a contactor switch 38. When the contactor switch 38 is closed, under normal operation, electric current can flow between the ESD 74 and the TPIM 19. When the contactor switch 38 is opened electric current flow between the ESD 74 and the TPIM 19 is interrupted. The TPIM 19 transmits electrical power to and from the first electric machine 56 by transfer conductors 29, and the TPIM 19 similarly transmits electrical power to and from the second electric machine 72 by transfer conductors 31 to meet the torque commands for the first and second electric machines 56 and 72 in response to the motor torques $T_A$ and $T_B$. Electrical current is transmitted to and from the ESD 74 in accordance with whether the ESD 74 is being charged or discharged.

The TPIM 19 includes the pair of power inverters (not shown) and respective motor control modules (not shown) configured to receive the torque commands and control inverter states therefrom for providing motor drive or regeneration functionality to meet the commanded motor torques $T_A$ and $T_B$. The power inverters comprise known complementary three-phase power electronics devices, and each includes a plurality of insulated gate bipolar transistors (not shown) for converting DC power from the ESD 74 to AC power for powering respective ones of the first and second electric machines 56 and 72, by switching at high frequencies. The insulated gate bipolar transistors form a switch mode power supply configured to receive control commands. There is typically one pair of insulated gate bipolar transistors for each phase of each of the three-phase electric machines. States of the insulated gate bipolar transistors are controlled to provide motor drive mechanical power generation or electric power regeneration functionality. The three-phase inverters receive or supply DC electric power via DC transfer conductors 27 and transform it to or from three-phase AC power, which is conducted to or from the first and second electric machines 56 and 72 for operation as motors or generators via transfer conductors 29 and 31 respectively.

FIG. 2 is a schematic block diagram of the distributed control module system. The elements described hereinafter comprise a subset of an overall vehicle control architecture, and provide coordinated system control of the exemplary hybrid powertrain described in FIG. 1. The distributed control module system synthesizes pertinent information and inputs, and executes algorithms to control various actuators to meet control objectives, including objectives related to fuel economy, emissions, performance, drivability, and protection of hardware, including batteries of ESD 74 and the first and second electric machines 56 and 72. The distributed control module system includes an engine control module (hereafter 'ECM') 23, the TCM 17, a battery pack control module (hereafter 'BPCM') 21, and the TPIM 19. A hybrid control module (hereafter 'HCP') 5 provides supervisory control and coordination of the ECM 23, the TCM 17, the BPCM 21, and the TPIM 19. A user interface ('UT') 13 is operatively connected to a plurality of devices through which a vehicle operator controls or directs operation of the electromechanical hybrid powertrain. The devices include an accelerator pedal 113 ('AP'), an operator brake pedal 112 ('BP'), a transmission gear selector 114 ('PRNDL'), and a vehicle speed cruise control (not shown). The transmission gear selector 114 may have a discrete number of operator-selectable positions, including the rotational direction of the output member 64 to enable one of a forward and a reverse direction.

The aforementioned control modules communicate with other control modules, sensors, and actuators via a local area network (hereafter 'LAN') bus 6. The LAN bus 6 allows for structured communication of states of operating parameters and actuator command signals between the various control modules. The specific communication protocol utilized is application-specific. The LAN bus 6 and appropriate protocols provide for robust messaging and multi-control module interfacing between the aforementioned control modules, and other control modules providing functionality including e.g., antilock braking, traction control, and vehicle stability. Multiple communications buses may be used to improve communications speed and provide some level of signal redundancy and integrity. Communication between individual control modules can also be effected using a direct link, e.g., a serial peripheral interface ('SPI') bus (not shown).

The HCP 5 provides supervisory control of the hybrid powertrain, serving to coordinate operation of the ECM 23, TCM 17, TPIM 19, and BPCM 21. Based upon various input signals from the user interface 13 and the hybrid powertrain, including the ESD 74, the HCP 5 determines an operator torque request, an output torque command, an engine input torque command, clutch torque(s) for the applied torque-transfer clutches C1 70, C2 62, C3 73, C4 75 of the transmission 10, and the motor torques $T_A$ and $T_B$ for the first and second electric machines 56 and 72. The TCM 17 is operatively connected to the hydraulic control circuit 42 and provides various functions including monitoring various pressure sensing devices (not shown) and generating and communicating control signals to various solenoids (not shown) thereby controlling pressure switches and control valves contained within the hydraulic control circuit 42.

The ECM 23 is operatively connected to the engine 14, and functions to acquire data from sensors and control actuators of the engine 14 over a plurality of discrete lines, shown for simplicity as an aggregate bi-directional interface cable 35. The ECM 23 receives the engine input torque command from the HCP 5. The ECM 23 determines the actual engine input torque, $T_I$, provided to the transmission 10 at that point in time based upon monitored engine speed and load, which is communicated to the HCP 5. The ECM 23 monitors input from the rotational speed sensor 11 to determine the engine input speed to the input shaft 12, which translates to the transmission input speed, $N_I$. The ECM 23 monitors inputs from sensors (not shown) to determine states of other engine operating parameters including, e.g., a manifold pressure, engine coolant temperature, ambient air temperature, and ambient pressure. The engine load can be determined, for example, from the manifold pressure, or alternatively, from monitoring operator input to the accelerator pedal 113. The ECM 23 generates and communicates command signals to control engine actuators, including, e.g., fuel injectors, ignition modules, and throttle control modules, none of which are shown.

The TCM 17 is operatively connected to the transmission 10 and monitors inputs from sensors (not shown) to determine states of transmission operating parameters. The TCM 17 generates and communicates command signals to control the transmission 10, including controlling the hydraulic circuit 42. Inputs from the TCM 17 to the HCP 5 include estimated clutch torques for each of the clutches, i.e., C1 70, C2 62, C3 73, and C4 75, and rotational output speed, No, of the output member 64. Other actuators and sensors may be used to provide additional information from the TCM 17 to the HCP 5 for control purposes. The TCM 17 monitors inputs from pressure switches (not shown) and selectively actuates pressure control solenoids (not shown) and shift solenoids (not shown) of the hydraulic circuit 42 to selectively actuate the various clutches C1 70, C2 62, C3 73, and C4 75 to achieve various transmission operating range states, as described hereinbelow.

The BPCM 21 is signally connected to sensors (not shown) to monitor the ESD 74, including states of electrical current and voltage parameters, to provide information indicative of parametric states of the batteries of the ESD 74 to the HCP 5. The parametric states of the batteries preferably include battery state-of-charge, battery voltage, battery temperature, and available battery power, referred to as a range $P_{BAT\_MIN}$ to $P_{BAT\_MAX}$.

A brake control module (hereafter 'BrCM') 22 is operatively connected to friction brakes (not shown) on each of the vehicle wheels 93. The BrCM 22 monitors the operator input to the brake pedal 112 and generates control signals to control the friction brakes and sends a control signal to the HCP 5 to operate the first and second electric machines 56 and 72 based thereon.

Each of the control modules ECM 23, TCM 17, TPIM 19, BPCM 21, and BrCM 22 is preferably a general-purpose digital computer comprising a microprocessor or central processing unit, storage mediums comprising read only memory ('ROM'), random access memory ('RAM'), electrically programmable read only memory ('EPROM'), a high speed clock, analog to digital ('A/D') and digital to analog ('D/A') circuitry, and input/output circuitry and devices ('I/O') and appropriate signal conditioning and buffer circuitry. Each of the control modules has a set of control algorithms, comprising resident program instructions and calibrations stored in one of the storage mediums and executed to provide the respective functions of each computer. Information transfer between the control modules is preferably accomplished using the LAN bus 6 and serial peripheral interface buses. The control algorithms are executed during preset loop cycles such that each algorithm is executed at least once each loop cycle. Algorithms stored in the non-volatile memory devices are executed by one of the central processing units to monitor inputs from the sensing devices and execute control and diagnostic routines to control operation of the actuators, using preset calibrations. Loop cycles are executed at regular intervals, for example each 3.125, 6.25, 12.5, 25 and 100 milliseconds during ongoing operation of the hybrid powertrain. Alternatively, algorithms may be executed in response to the occurrence of an event.

The exemplary hybrid powertrain selectively operates in one of several operating range states that can be described in terms of an engine state comprising one of an engine-on state ('ON') and an engine-off state ('OFF'), and a transmission state comprising a plurality of fixed gears and continuously variable operating modes, described with reference to Table 1, below.

TABLE 1

| Description | Engine State | Transmission Operating Range State | Applied Clutches | |
| --- | --- | --- | --- | --- |
| M1_Eng_Off | OFF | EVT Mode 1 | C1 70 | |
| M1_Eng_On | ON | EVT Mode 1 | C1 70 | |
| G1 | ON | Fixed Gear Ratio 1 | C1 70 | C4 75 |
| G2 | ON | Fixed Gear Ratio 2 | C1 70 | C2 62 |
| M2_Eng_Off | OFF | EVT Mode 2 | C2 62 | |
| M2_Eng_On | ON | EVT Mode 2 | C2 62 | |
| G3 | ON | Fixed Gear Ratio 3 | C2 62 | C4 75 |
| G4 | ON | Fixed Gear Ratio 4 | C2 62 | C3 73 |

Each of the transmission operating range states is described in the table and indicates which of the specific clutches C1 70, C2 62, C3 73, and C4 75 are applied for each of the operating range states. A first continuously variable mode, i.e., EVT Mode 1, or M1, is selected by applying clutch C1 70 only in order to "ground" the outer gear member of the third planetary gear set 28. The engine state can be one of ON ('M1_Eng_On') or OFF ('M1_Eng_Off'). A second continuously variable mode, i.e., EVT Mode 2, or M2, is selected by applying clutch C2 62 only to connect the shaft 60 to the carrier of the third planetary gear set 28. The engine state can be one of ON ('M2_Eng_On') or OFF ('M2_Eng_Off'). For purposes of this description, when the engine state is OFF, the engine input speed is equal to zero revolutions per minute ('RPM'), i.e., the engine crankshaft is not rotating. A fixed gear operation provides a fixed ratio operation of input-to-output speed of the transmission 10, i.e., $N_I/N_O$. A first fixed gear operation ('G1') is selected by applying clutches C1 70 and C4 75. A second fixed gear operation ('G2') is selected by applying clutches C1 70 and C2 62. A third fixed gear operation ('G3') is selected by applying clutches C2 62 and C4 75. A fourth fixed gear operation ('G4') is selected by applying clutches C2 62 and C3 73. The fixed ratio operation of input-to-output speed increases with increased fixed gear operation due to decreased gear ratios in the planetary gears 24, 26, and 28. The rotational speeds of the first and second electric machines 56 and 72, $N_A$ and $N_B$ respectively, are dependent on internal rotation of the mechanism as defined by the clutching and are proportional to the input speed measured at the input shaft 12.

In response to operator input via the accelerator pedal 113 and brake pedal 112 as captured by the user interface 13, the HCP 5 and one or more of the other control modules determine torque commands to control the torque generative devices comprising the engine 14 and first and second electric machines 56 and 72 to meet the operator torque request at the output member 64 and transferred to the driveline 90. Based upon input signals from the user interface 13 and the hybrid powertrain including the ESD 74, the HCP 5 determines the operator torque request, a commanded output torque from the transmission 10 to the driveline 90, an input torque from the engine 14, clutch torques for the torque-transfer clutches C1 70, C2 62, C3 73, C4 75 of the transmission 10; and the motor torques for the first and second electric machines 56 and 72, respectively, as is described hereinbelow.

Final vehicle acceleration can be affected by other factors including, e.g., road load, road grade, and vehicle mass. The operating range state is determined for the transmission 10 based upon a variety of operating characteristics of the hybrid powertrain. This includes the operator torque request communicated through the accelerator pedal 113 and brake pedal 112 to the user interface 13 as previously described. The operating range state may be predicated on a hybrid powertrain torque demand caused by a command to operate the first and second electric machines 56 and 72 in an electrical energy generating mode or in a torque generating mode. The operating range state can be determined by an optimization algorithm or routine which determines optimum system efficiency based upon operator demand for power, battery state of charge, and energy efficiencies of the engine 14 and the first and second electric machines 56 and 72. The control system manages torque inputs from the engine 14 and the first and second electric machines 56 and 72 based upon an outcome of the executed optimization routine, and system efficiencies are optimized thereby, to manage fuel economy and battery charging. Furthermore, operation can be determined based upon a fault in a component or system. The HCP 5 monitors the torque-generative devices, and determines the power output from the transmission 10 required in response to the desired output torque at output member 64 to meet the operator torque request. As should be apparent from the description above, the ESD 74 and the first and second electric machines 56 and 72 are electrically-operatively coupled for power flow therebetween. Furthermore, the engine 14, the first and second electric machines 56 and 72, and the electromechanical transmission 10 are mechanically-operatively coupled to transfer power therebetween to generate a power flow to the output member 64.

Figure 3:
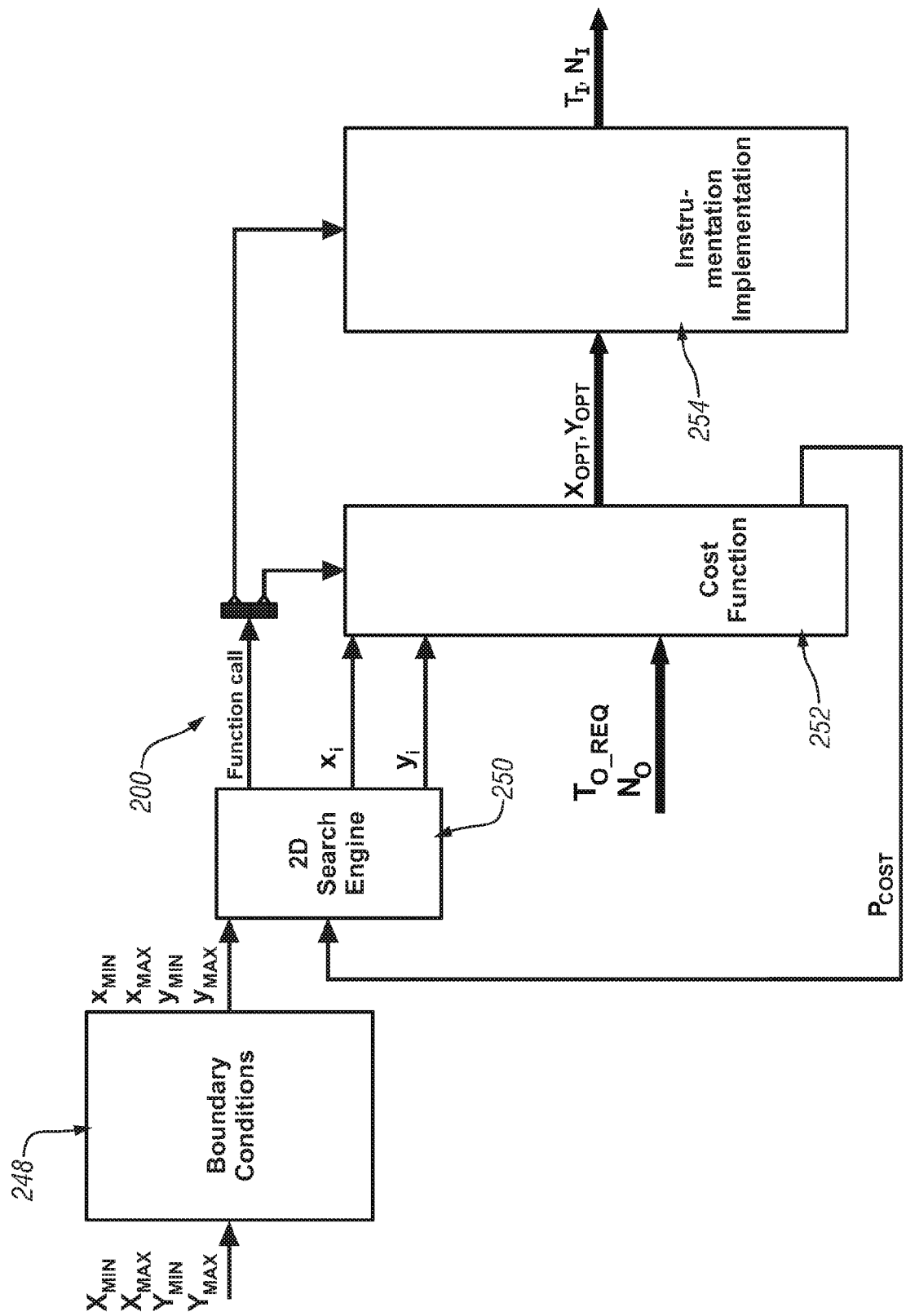
FIG. 3 is a process flow diagram of an exemplary method for controlling a speed level and a torque level within a powertrain, in accordance with the present disclosure.
Figure 4:
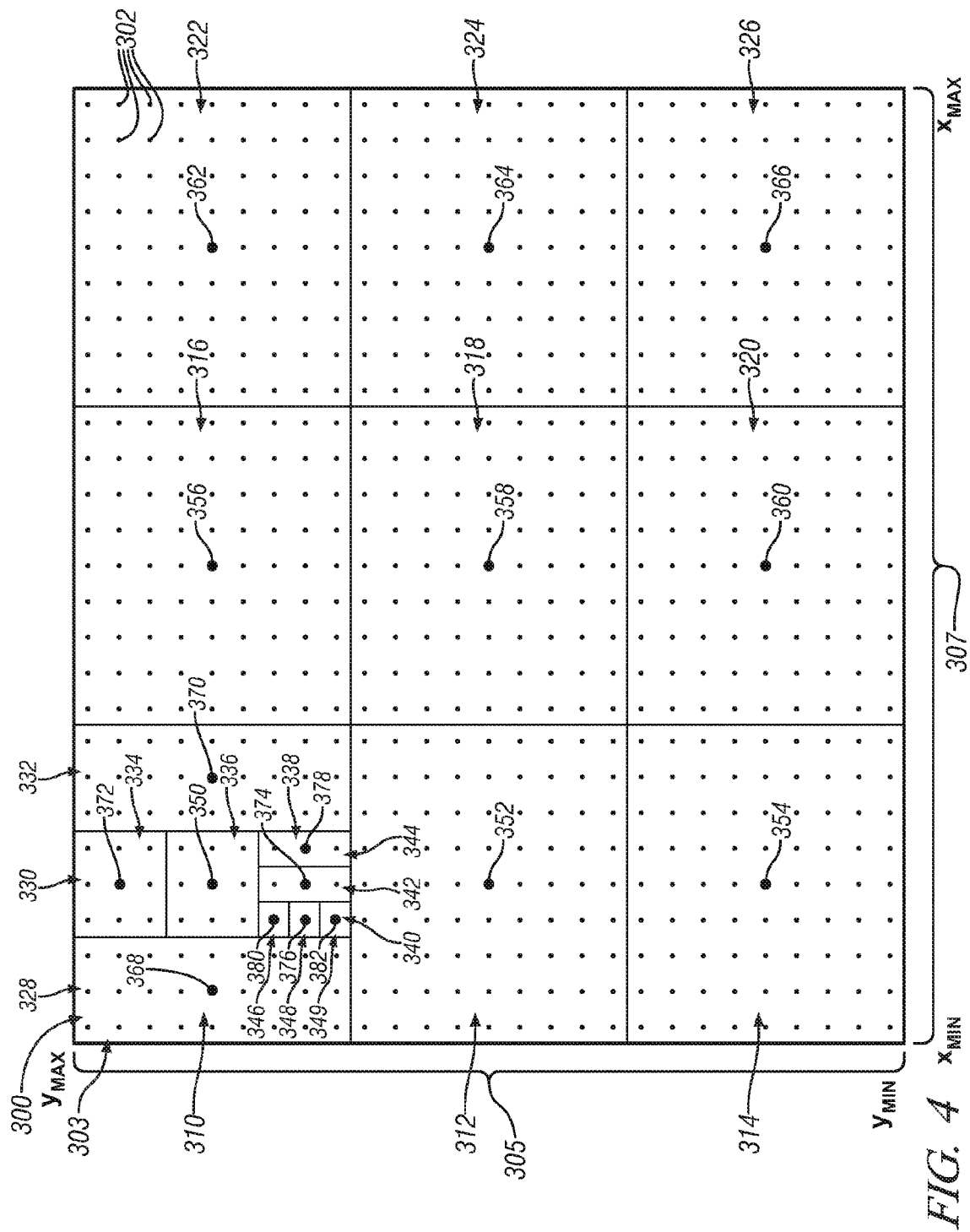
FIG. 4 is a graphical representation of an exemplary search, in accordance the present disclosure.

FIG. 3 and FIG. 4 show a method 200 for determining a preferred operating point for operating the engine 14 and the transmission 10 to transmit power to the driveline 90 in response to an operator torque request ('$T_{O\_REQ}$'), and a graph 300 of an iterative search performed using the method 200. The method 200 is preferably utilized during operation in the first and second continuously variable modes. During the first and second continuously variable modes, the transmission 10 transmits mechanical power using one clutch, i.e., either clutch C1 62 or C2 70 from the engine 14 and the first and second electric machine 56 and 72, and the engine 14 operates at an operating point described in terms of power to the transmission 10 at an operating point described in terms of the input speed N, and the input torque $T_I$. The method 200 controls the engine 14 at the operating point by preferably executing algorithms and calibrations in the HCP 5 that includes conducting a two-dimensional search to determine the preferred engine operating point. The preferred engine operating point can include an input power $P_{ENG\_I}$ from the engine that comprises the input speed $N_I$ multiplied by the input torque $T_I$.

Boundary conditions of the engine operating points are defined (248). In one embodiment, the boundary conditions define a two-dimensional search area 303 from which a plurality of engine operating points 302 can be provided within the two-dimensional search area 303. The two-dimensional search area 303 is determined based upon the input power $P_{ENG\_I}$ transmitted from the engine 14 to the transmission 10. In an exemplary embodiment, the two-dimensional search area 303 comprises a range of permissible input power values from −1 kW to 40 kW and a range of permissible input speed values from 600 RPM to 2000 RPM. In alternate embodiments, the two-dimensional search area 303 comprises a range of permissible input speed values and a range of permissible input torque values or a range of permissible input power values and the range of permissible input torque values.

The range of permissible input power values associated with engine input power include input power values ['Y'] from a minimum permissible input power ['$Y_{MIN}$'] to a maximum permissible input power ['$Y_{MAX}$']. The range of permissible input speed values from the engine 14 include input speed values ['X'] from a minimum permissible input speed ['$X_{MIN}$'] to a maximum permissible input speed ['$X_{MAX}$']. The HCP 5 utilizes the output speed $N_O$ of the transmission 10 and the operator torque request $T_{O\_REQ}$ in a lookup table (not shown) to obtain the minimum permissible input power $Y_{MIN}$, the maximum permissible input power $Y_{MAX}$, the minimum permissible input speed $X_{MIN}$, and the maximum permissible input speed $X_{MAX}$. In alternative embodiments, the minimum permissible input power $Y_{MIN}$, the maximum permissible input power $Y_{MAX}$, the minimum permissible input speed $X_{MIN}$, and the maximum permissible input speed $X_{MAX}$ can be based on measurements of other operating properties of the powertrain.

The maximum permissible input power $Y_{MAX}$ and the minimum permissible input power $Y_{MIN}$ are normalized such that the maximum permissible input power $Y_{MAX}$ corresponds to a normalized maximum input power ['$y_{MAX}$'], which has a value of one, and the minimum permissible input power $Y_{MIN}$ corresponds to a normalized minimum permissible input power ['$y_{MIN}$'], which has a value of zero. The maximum permissible input speed $X_{MAX}$ and the minimum permissible input speed $X_{MIN}$ are normalized such that the maximum permissible input speed $X_{MAX}$ corresponds to a normalized maximum permissible input speed ['$x_{MAX}$'], which has a value of one, and the minimum permissible input speed $X_{MIN}$ corresponds to a normalized minimum permissible input speed ['$x_{MIN}$'], which has a value of zero.

In one embodiment each of the engine operating points 302 is a predetermined engine operating point associated with a predetermined coordinate (that is, a predetermined normalized input speed value x and a predetermined normalized input power value y) of the two-dimensional search area 303. The engine operating points 302 are stored in one of the memory devices accessible by the HCP 5. In one embodiment, a distance between each of the engine operating points 302 is spaced at equal increments of normalized input speed x and normalized input power y throughout the two-dimensional search area 303.

The HCP 5 defines search regions within the two-dimensional search area 303. In one embodiment, a single search region comprises the entire area of the two-dimensional search area 303. In one embodiment, more search regions are provided by dividing the two-dimensional search area 303 at normalized input speed values x, at normalized input power values y, or at both normalized input speed values x and normalized input power values y. In one embodiment, the HCP 5 defines search regions by segmenting the two-dimensional search area 303 into three search regions by providing lines at two normalized input speed values. In one embodiment, the HCP 5 defines the search regions by providing a plurality of search regions such that each search region is a rectangle. In one embodiment, the HCP 5 defines search regions such that each search region has an equal area.

The HCP 5 defines the search regions by segmenting the two-dimensional search area 303 into a plurality of search regions comprising search regions 310, 312, 314, 316, 318, 320, 322, 324, and 326.

The HCP 5 determines an engine operating point within each search region 310, 312, 314, 316, 318, 320, 322, 324, and 326. In one embodiment, the HCP 5 determines an engine operating point located at a center of each search region 310, 312, 314, 316, 318, 320, 322, 324, and 326. Each search region includes one of a corresponding first plurality of engine operating point 350, 352, 354, 356, 358, 360 and 362. In one embodiment, each engine operating point is precalibrated and is preassociated with one of the search regions in the memory device. The search region 310 includes the engine operating point 350, the search region 312 includes the engine operating point 352, the search region 314 includes the engine operating point 354, a search region 316 includes the engine operating point 356, a search region 318 includes the engine operating point 358, a search region 320 includes the engine operating point 360, a search region 322 includes the engine operating point 362, a search region 324 includes an engine operating point 364, and a search region 326 includes the engine operating point 366.

The HCP 5 calculates an operating cost $P_{COST}$ to operate the engine 14 associated with each engine operating point 350, 352, 354, 356, 358, 360, 362, 364, 366 and associated with the operator torque request $T_{O\_REQ}$ and the output speed $N_O$ of the transmission 10 by executing a cost function $f(X,Y, N_O, T_{O\_REQ})$ (252). The HCP 5 calculates an operating cost to operate the internal combustion engine and the electromechanical transmission to meet the operator torque request $T_{O\_REQ}$ for each engine operating point within each of the subregions. The HCP 5 determines the speed relationship as defined shown in Eq. 1, below:

$$\begin{bmatrix} N_A \\ N_B \end{bmatrix} = \begin{bmatrix} b_{11} & b_{12} \\ b_{21} & b_{22} \end{bmatrix} \begin{bmatrix} N_I \\ N_O \end{bmatrix} \quad [1]$$

wherein, $N_O$ is the output speed, $N_A$ is the operating speed for the first electric machine 56, $N_B$ is the operating speed for the second electric machine 72, and $b_{11}, b_{12}, b_{21}, b_{22}$, are known scalar values determined for the specific application in the specific operating range state. Therefore, the determined scalar values for $b_{11}, b_{12}, b_{21}, b_{22}$ are specific to each of EVT Mode 1 and EVT Mode 2. In this application, when the transmission output speed, $N_O$ is known, there is one degree of freedom in input speed $N_I$, by which $N_A$ and $N_B$ can be determined.

The HCP 5 determines the torque the relationship as shown in Eq. 2, below:

$$\begin{bmatrix} T_A \\ T_B \end{bmatrix} = \begin{bmatrix} d_{11} & d_{12} & d_{13} & d_{14} \\ d_{21} & d_{22} & d_{23} & d_{24} \end{bmatrix} \begin{bmatrix} T_I \\ T_O \\ \dot{N}_I \\ \dot{N}_O \end{bmatrix} \quad [2]$$

wherein the $T_O$ is the transmission output torque at which is set to the operator torque request $T_{O\_REQ}$, $T_A$ and $T_B$ are the operating torques for MG-A 56 and MG-B 72, $\dot{N}_I$ and $\dot{N}_O$ represent time-rate changes in input speed from the engine 14 and output speed of the transmission 10, and $d_{11}, d_{12}, d_{13}, d_{14}, d_{21}, d_{22}, d_{23}, d_{24}$ are known scalar values determined for each operating range state, i.e., either one of EVT Mode 1 and EVT Mode 2, of the application. In this application, when the transmission output torque $T_O$ is known, there is one degree of torque freedom for input torque $T_I$, by which $T_A$ and $T_B$ can be determined.

The HCP 5 denormalizes each engine operating point of the first plurality of engine operating points to their corresponding input speed and input power values (X,Y) using scaling based on normalization. The HCP 5 inputs the operator torque request $T_{O\_REQ}$, the output speed $N_O$ and the input speed and input power values (X,Y) of each engine operating point of the first plurality of engine operating points into the cost function $f(X,Y, N_O, T_{O\_REQ})$ 252 to determine the overall cost $P_{COST}$. The cost function $f(X,Y, N_O, T_{O\_REQ})$ 252 comprises operating costs which are generally determined based upon factors that include vehicle driveability, fuel economy, emissions, and battery usage. Furthermore, costs are assigned and associated with fuel and electrical power consumption and are further associated with a specific engine operating points of the powertrain. Lower operating costs are generally associated with lower fuel consumption at high conversion efficiencies, lower battery power usage, and lower emissions for an engine operating point, and take into account a current operating state of the powertrain system. The overall system power loss comprises a term based upon engine power loss driven by fuel economy and exhaust emissions, plus losses in the mechanical system (e.g., gears, pumps, belts, pulleys, valves, chains), losses in the electrical system (e.g. wire impedances and switching and solenoid losses), and heat losses. Other losses include electrical machine power losses and internal battery power losses. Other factors may also be considered, including factors related to battery life due to depth of discharge of the ESD 74, current ambient temperatures and their effect on state of charge of the battery.

The HCP 5 calculates a cost $P_{COST352}$, a cost $P_{COST354}$, a cost $P_{COST356}$, a cost $P_{COST358}$, a cost $P_{COST360}$, a cost $P_{COST362}$, a cost $P_{COST364}$, and a cost $P_{COST366}$ for the corresponding engine operating points 352, 354, 356, 358, 360, 362, 364, respectively. The HCP 5 performs a base point determination by determining which of the cost $P_{COST352}$, the cost $P_{COST354}$, the cost $P_{COST356}$, or the cost $P_{COST358}$, the cost $P_{COST360}$, the cost $P_{COST362}$, the cost $P_{COST364}$, and the cost $P_{COST366}$ has the lowest value, and determines the engine operating point associated with the lowest value as a base point of the first plurality of engine operating points. FIG. 4 depicts an exemplary embodiment in which the HCP 5 identifies a lowest cost of the first plurality of cost values to be the cost $P_{COST350}$ and therefore, identifies the engine operating point 350 as the base point of the first plurality of engine operating points and the search region 310 as the base search region of the first plurality of search regions.

The HCP 5 segments the search region 310 into a first plurality of subregions utilizing the search engine 250 based on normalized input speeds x. In one embodiment, the HCP 5 divides the search region 310, into a first plurality of subregions comprising a subregion 328, a subregion 330, and a subregion 332. The HCP 5 determines an engine operating point within each of the subregions of the first plurality of subregions. In one embodiment, the HCP 5 determines an engine operating point located at a geometric center of each of the subregions. In one embodiment, each of the subregions of the first plurality of subregions includes one of a second plurality of engine operating points comprising engine operating points 350, 368, and 370. In one embodiment, the subregion 328, the subregion 330 and the subregion 332 have a rectangular shape. In one embodiment, the subregion 328 includes the engine operating point 368, the subregion 330 includes the engine operating point 350, and the subregion 332 includes the engine operating point 370.

The HCP 5 executes the cost function 252 to calculate a cost $P_{COST}$ associated with each engine operating point of the second plurality of engine operating points. The HCP 5 calculates a third plurality of cost values comprising a cost $P_{COST368}$ and a cost $P_{COST370}$ for the engine operating point 368, and the engine operating point 370, respectively. The HCP 5 performs the base point determination by determining which of the cost $P_{COST368}$, the cost $P_{COST370}$, or the cost $P_{COST350}$ has the lowest value, and determines the engine operating point associated with the lowest value as the base point of the second plurality of engine operating points. FIG. 4 depicts an exemplary embodiment in which the HCP 5 identifies a lowest cost of the second plurality of cost values to be the cost $P_{COST350}$ and therefore, identifies the engine operating point 350 as the base point of the second plurality of engine operating points and the subregion 330 as the base subregion of the first plurality of subregions.

The HCP 5 segments the subregion 330 into a second plurality of subregions based on the normalized input power y. In one embodiment, the HCP 5 divides the subregion 330 into subregions 334, 336, and 338. In one embodiment, subregions 334, 336 and 338 have a rectangular shape. In one embodiment, the subregions 334, 336, and 338 are orthogonal to the first plurality of subregions. In one embodiment, the subregion 334 includes the engine operating point 372, the subregion 336 includes the engine operating point 350, and the subregion 338 includes the engine operating point 374. A third plurality of engine operating points includes engine operating points 350, 372, and 374.

The HCP 5 executes the cost function 252 to calculate a cost $P_{COST}$ associated with each engine operating point of the third plurality of engine operating points. The HCP 5 calculates a cost $P_{COST372}$ and a cost $P_{COST374}$ for the engine operating point 372, and the engine operating point 374, respectively. The HCP 5 performs the base point determination by determining which of the cost $P_{COST372}$, the cost $P_{COST350}$, or the cost $P_{COST374}$ has the lowest value, and determines the engine operating point associated with the lowest value as the base point of the third plurality of engine operating points. FIG. 4 depicts an exemplary embodiment in which the HCP 5 identifies a lowest cost of the third plurality of cost values to be the cost $P_{COST374}$ and therefore, identifies the engine operating point 374 as the base point of the third plurality of engine operating points and the subregion 338 as the base subregion for the second plurality of subregions.

The HCP 5 determines a third plurality of subregions comprising subregions 340, 342, and 344 based on the engine operating point 350. The HCP 5 determines a cost $P_{COST376}$ for an engine operating point 376 in subregion 340, a cost $P_{COST378}$ for an engine operating point 378 for engine operating point 378 in subregion 344. The HCP 5 performs the base point determination by determining which of the cost $P_{COST372}$, the cost $P_{COST374}$, or the cost $P_{COST378}$ has the lowest value, and determines the engine operating point associated with the lowest value as the base point for the fourth plurality of engine operating points. FIG. 4 depicts an exemplary embodiment in which the HCP 5 identifies a lowest cost of the fourth plurality of engine operating points to be cost $P_{COST376}$ and therefore, determines the engine operating point 376 as the base point and the subregion 340 as the base subregion.

The HCP 5 determines a fourth plurality of subregions comprising a subregion 346, a subregion 348, and a subregion 349 based on the engine operating point 376. The HCP 5 determines a cost $P_{COST380}$ for an engine operating point 380 in subregion 346, and a cost $P_{COST382}$ for an engine operating point 382 in subregion 340. The HCP 5 performs the base point determination by determining which of the cost $P_{COST380}$, the cost $P_{COST376}$, or the cost $P_{COST382}$ has the lowest value, and determines the engine operating point associated with the lowest value as the base point for the fifth plurality of engine operating points.

The HCP 5 continues to utilize the search engine 250 and the cost function 252 until a selected number of costs are calculated, or a predetermined number of iterations are executed. Although, the predetermined number iterations can be determined based on a desired search resolution or a desired search speed, in one embodiment, ten iterations are performed. In one embodiment, eleven iterations are performed. In one embodiment, the HCP 5 calculates 100 cost values. In one embodiment, the HCP 5 calculates 30 cost values. The HCP 5 determines a preferred engine operating point within the iteratively identified subregion (that is, the subregion identified as having a engine operating point with a lowest cost $P_{COST}$ after a predetermined number iterations) having the minimum operating cost to meet the operator torque request. The preferred engine operating points associated with an optimal speed value $X_{OPT}$ and an optimal input power value $Y_{OPT}$.

The HCP 5 utilizing the method 200 to calculate cost values $P_{COST}$ rapidly due to the separation of the search engine 250 and the cost function 252. In particular, the search engine 250 determines pluralities of engine operating points and provides each plurality of engine operating points to the cost function 252 such that the cost function 252 of cost only has to solve for one unknown variable per engine operating point. The HCP 5 utilizing the method 200 to calculate twenty-eight cost values in less than twenty-five milliseconds.

In alternative embodiments, the HCP 5 performs other amounts of cost calculations. Further, in other alternative embodiments, the HCP 5 performs cost calculations until a selected amount of time elapses or until a selected search tolerance level is reached.

The powertrain is controlled based on the optimal engine operating point as determined by the search engine 250 and the cost function 252. The values for $X_{OPT}$, $Y_{OPT}$ are translated to an optimal input speed $N_{I\_OPT}$ and an input power $P_{I\_OPT}$ from the engine 14. Optimal input torque $T_{I\_OPT}$ is determined by dividing optimal input speed $N_{I\_OPT}$ by the optimal input power $P_{I\_OPT}$. The HCP 5 commands operation of the engine 14 at optimal input torque $T_{I\_OPT}$ and optimal input speed $N_{I\_OPT}$ (254).

As mentioned above, the HCP 5 utilizes the method 200 to control the transmission 10 in the first or second continuously variable modes. The HCP 5 controls the input speed and input torque of the engine utilizing Eqs. 1 and 2 as described wherein the input speed $N_I$ is set to the optimal input speed $N_{I\_OPT}$, and wherein the input torque $T_I$ and is set to the optimal input torque $T_{I\_OPT}$.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. A method for operating an internal combustion engine mechanically coupled to an electro-mechanical transmission to transmit power to a driveline in response to an operator torque request, the method comprising:
   defining a two-dimensional search region based upon an input power transmittable
      between the internal combustion engine and the electro-mechanical transmission;
   iteratively
      dividing the two-dimensional search region into a plurality of subregions based upon one of the input power and an input speed transmittable from the internal combustion engine to the electro-mechanical transmission,
      determining an engine operating point within each of the subregions,
      calculating an operating cost to operate the internal combustion engine and the electro-mechanical transmission to meet the operator torque request for each engine operating point within each of the subregions,
      identifying the subregion having a minimum operating cost to meet the operator torque request; and
   determining a preferred engine operating point based upon the engine operating point within the identified subregion having the minimum operating cost to meet the operator torque request.

2. The method of claim 1, further comprising defining a two-dimensional search area based upon input power transmittable between the internal combustion engine and the electro-mechanical transmission.

3. The method of claim 2, wherein the two-dimensional search area comprises a range of permissible input speeds and a range of permissible input torques.

4. The method of claim 2, wherein the two-dimensional search area comprises a range of permissible input powers and a range of permissible input speeds.

5. The method of claim 1, comprising dividing the two-dimensional search region into a plurality of rectangular-shaped subregions.

6. The method of claim 1, comprising determining an engine operating point located at a geometric center of each of the subregions.

7. The method of claim 1, further comprising controlling the input speed and the input torque of the internal combustion engine based on the preferred engine operating point.

8. The method of claim 1, comprising calculating the operating cost based upon vehicle driveability, fuel economy, emissions, and battery usage.

9. The method of claim 1, wherein each engine operating point in each subregion comprises a precalibrated normalized engine operating point.

10. The method of claim 1, wherein the method comprises one of ten iterations and eleven iterations.

11. A method for operating an internal combustion engine mechanically connected to an electro-mechanical transmission to transmit power to a driveline in response to an operator torque request, the method comprising:
   defining a two-dimensional search region comprising an input torque range and an input speed range transmittable from the internal combustion engine to the electro-mechanical transmission;
   iteratively
      dividing the two-dimensional search region into a plurality of subregions based upon one of the input torque and an input speed transmittable from the internal combustion engine to the electro-mechanical transmission,
      determining an engine operating point within each of subregions,
      calculating an operating cost to operate the internal combustion engine and the electro-mechanical transmission to meet the operator torque request for each of the engine operating points within each of the subregions,
      identifying the subregion having a minimum operating cost based on the operator torque request; and
   determining a preferred input speed and a preferred input torque for operating the internal combustion engine based upon the iteratively identified subregion having the minimum operating cost based on the operator torque request.

12. The method of claim 11, further comprising:
   identifying a two-dimensional search area comprising a range of permissible input torques and a range of permissible input speeds transmittable from the internal combustion engine to the electro-mechanical transmission;
   dividing the two-dimensional search area into the plurality of search regions based upon the input torque and the input speed;
   determining an engine operating point within each of the plurality of search regions;
   calculating an operating cost in response to the operator torque request for each of the engine operating points within each of the plurality of search regions; and
   selecting the search region having a minimum calculated operating cost in response to the operator torque request for the engine operating points within the plurality of search regions.

13. The method of claim 11, comprising dividing the two-dimensional search region into a plurality of rectangular-shaped subregions.

14. The method of claim 11, comprising determining an engine operating point located at a geometric center of each subregion.

15. The method of claim 11, further comprising controlling the input speed and the input torque of the internal combustion engine based on the preferred engine operating point.

16. The method of claim 11, comprising calculating the operating costs based upon vehicle driveability, fuel economy, emissions, and battery usage.

17. The method of claim 11, wherein each engine operating point in each subregion comprises a precalibrated normalized engine operating point.

18. The method of claim 11 comprising dividing the two-dimensional search region into a plurality of subregions by iteratively alternating dividing search regions based upon input torques and input speeds.

19. The method of claim 11, comprising dividing the two-dimensional search region into three subregions.

20. The method of claim 11, wherein the method comprises one of ten iterations and eleven iterations.

* * * * *